United States Patent [19]
Brady et al.

[11] Patent Number: 6,122,353
[45] Date of Patent: *Sep. 19, 2000

[54] METHOD AND APPARATUS FOR DETECTING A TELEPHONE CPE ALERTING SIGNAL

[75] Inventors: Robert H. Brady, Brookfield; David Zielski, Cheshire; William L. Nutter, Danbury, all of Conn.; Alexander J. Marra, New City, N.Y.

[73] Assignee: Cidco Incorporated, Morgan Hill, Calif.

[ * ] Notice: This patent is subject to a terminal disclaimer.

[21] Appl. No.: 08/892,102

[22] Filed: Jul. 14, 1997

Related U.S. Application Data

[63] Continuation of application No. 08/357,172, Dec. 13, 1994, Pat. No. 5,649,002.

[51] Int. Cl.$^7$ ..................................................... H04M 1/56
[52] U.S. Cl. .......................... 379/142; 379/215; 379/351
[58] Field of Search .................................... 379/142, 215, 379/351, 236, 237, 257; 375/256; 364/724.09

[56] References Cited

U.S. PATENT DOCUMENTS

| | | | |
|---|---|---|---|
| 4,191,862 | 3/1980 | Hughes | 379/236 |
| 5,189,634 | 2/1993 | Eberle et al. | 364/724.09 |
| 5,228,080 | 7/1993 | Nutter et al. | |
| 5,263,084 | 11/1993 | Chaput et al. | |
| 5,737,400 | 4/1998 | Bagachi et al. | 379/142 |
| 5,812,649 | 9/1998 | Shen | 379/142 |

OTHER PUBLICATIONS

"Test Guidelines for Analog Type 1, 2 and 3 CPE as Described in SR–INS–002726", Bellcore (Bell Communications Research) Special Report SR–NWT–003004, Issue 1, Feb. 1994.

"Customer Premises Equipment Compatibility Considerations for the Voiceband Data Transmission Interface", Bellcore (Bell Communications Research) Special Report SR–TSV–002476, Issue 1, Dec. 1992.

"Voiceband Data Transmission Interface Generic Requirements", Bellcore Technical Reference TR–NWT–000030, Issue 2, Oct. 1992.

"Test Guidelines for Analog Types 1–3 CPE as Described in SR–INS–002726", Bellcore (Bell Communications Research) Special Report SR–NWT–003004, Issue 1, Feb. 1994.

*Primary Examiner*—Curtis A. Kuntz
*Assistant Examiner*—Rexford N. Barnie
*Attorney, Agent, or Firm*—Pennie & Edmonds LLP

[57] ABSTRACT

A method and apparatus for verifying that a CAS (Customer Premises Equipment Alerting Signal) detect signal, which indicates the presence of a CAS on a transmission channel, is a valid detect signal, includes structure and process steps for suppressing a signal originating at a local telephone in response to the CAS detect signal. A determination is made whether the CAS detect signal remains in a predetermined condition at a predetermined time after the local telephone signal is suppressed. A validity signal is output when the CAS detect signal remains in the predetermined condition at the predetermined time. False detections are thereby minimized by ignoring detections caused by a signal originating at the local telephone.

4 Claims, 6 Drawing Sheets

METHOD AND APPARATUS FOR DETECTING A TELEPHONE CPE ALERTING SIGNAL

This application is a continuation of application Ser. No. 08/357,172 filed Dec. 13, 1994, now U.S. Pat. No. 5,649,002.

BACKGROUND OF THE INVENTION

1. Field of the Invention

The present invention relates to a method and apparatus for processing a telephone Customer Premises Equipment Alerting Signal (CAS) and, more particularly, to a method and apparatus for detecting a CAS in the presence of a voice signal, verifying that the detected CAS is a valid CAS, and responding to the CAS with an appropriate acknowledge signal.

2. Description of the Related Art

Many telephone companies provide a Caller ID service wherein a person (hereinafter referred to as the called party, the subscriber, the local party, and the like) is provided with information concerning a calling party while the telephone of the called party is still ringing. For example, the telephone number and, in some cases, also the identity, e.g., name, of the calling party can be displayed on a device adjacent to the telephone before the called party answers the telephone.

To provide Caller ID service, the telephone company transmits the calling party information over a telephone line to the called party, typically between ring signals. In the U.S., the information is usually transmitted between the first and second ring signals. The information is transmitted in the voice band in the form of a Frequency Shift Keying (FSK) signal at 1200 baud. The calling party information is transmitted in an Incoming Calling Line Identification (ICLID) signal, which includes a channel seizure signal, a mark signal, and a data signal.

A unit of Customer Premises Equipment (CPE; located adjacent to or integral with the telephone) called a Caller ID device detects, decodes, and displays the ICLID signal prior to the start of the second ring signal. The called party can use the displayed information to decide whether or not to answer the call. In addition, the Caller ID device can store in a memory the called party information along with the date and time of the call for later review by the user.

Many telephone companies also provide a service called Call Waiting. Call Waiting is a service in which an audible alerting signal is provided to alert a called party, who is engaged in a telephone conversation with a first party, that a second party is attempting to place a call to the called party. The audible alerting signal is referred to as a Subscriber Alerting Signal (SAS) and typically has a frequency of 440 Hz. Upon hearing the SAS, the called party can choose to put the first party on hold and answer the new incoming call by executing a switch-hook flash. A telephone company Central Office recognizes the switch-hook flash, puts the first party on hold, and connects the second party to the called party. The called party can switch back and forth between the first and second parties by executing one or more switch-hook flashes.

Conventionally, Caller ID and Call Waiting services have been independent; Caller ID is provided when a telephone is on-hook, and Call Waiting is provided when a telephone is off-hook. However, many telephone companies will soon offer a new service which combines Caller ID with Call Waiting. This new service allows a called party who receives an SAS while engaged in a conversation with a first party to receive information regarding the second party who is trying to reach the called party. In this manner, upon hearing an SAS indicating another incoming call, the called party can observe the number, and in some cases the identity, of the second party. This information can assist the called party in determining whether to put the first party on hold and answer the second party's call.

The new service is referred to as Calling Identity Delivery on Call Waiting (CIDCW). A CIDCW protocol is outlined in Bellcore Special Report SR-TSV-002476 (Issue 1, December 1992), Bellcore Technical Reference TR-NWT-000030 (Issue 2, October 1992), and Bellcore Special Report SR-NWT-003004 (Issue 1, February 1994) (collectively referred to as "the Bellcore specification"). This specification outlines a signaling protocol that allows Caller ID information related to a new call to be transmitted to a customer while the customer is on line with an established call. The transmitted information is similar to an ICLID signal, although it does not need a channel seizure signal, and can be processed in a similar way. The Bellcore specification also provides CPE compatibility considerations for CIDCW. As discussed below, CPE devices for use with CIDCW must handle several complex problems that do not exist with conventional Caller ID.

Conventional Caller ID information, i.e., an ICLID signal, is easy to detect in the U.S. since it is typically transmitted after a first ring signal. The ring signal is easy to detect and can be relied upon to initiate a process for receiving the Caller ID information. Further, the Caller ID information is relatively easy to detect since it is transmitted in an on-hook state, i.e., prior to establishing a telephone line connection. There is relatively little noise on the line in the on-hook state since there is no voice signal.

In contrast, the calling party information provided for CIDCW must be sent whenever a second party attempts to place a call, rather than at a predetermined time. This means a CPE device at a called party's location must be alerted when calling party information is to be sent. To address this timing problem, the Bellcore specification specifies that a CPE Alerting Signal (CAS) be sent to the called party by the Central Office just after sending the 440 Hz SAS. The CAS is a dual tone multi-frequency (DTMF) signal consisting of a 2130 Hz tone and a 2750 Hz tone and has a duration of 80 to 85 ms. When the CAS is detected by a CPE device at the called party's location, the local telephone is muted while a DTMF "D" acknowledge signal, consisting of a 941 Hz tone and a 1633 Hz tone, is sent back to the Central Office to initiate transmission of the calling party information. The local telephone remains muted while the calling party information is transmitted by the Central Office in response to the acknowledge signal.

The muting of the local telephone, which occurs after a CAS has been detected, prevents interference with the acknowledge signal and the calling party information signal. In addition, since the calling party information signal produces an unpleasant, raucous noise in the telephone, the muting ensures that the called party does not have to listen to that noise.

One problem posed by the Bellcore specification is that the CAS must be detected in the presence of voice signals during an established call. This is a much more difficult task than detecting conventional Caller ID information in a relatively quiet, on-hook state. The Central Office can mute the voice signal of the distant party currently on-line with the local party before transmitting the CAS. However, the local voice signal of the called party, i.e., a near-end speech signal, will often be present during transmission of the CAS. Typically, the signal-to-noise ratio (SNR) for a CAS received at the called party's location will be a negative value, and may be quite low. In the worst case, the CAS may be at a level of −32 dB when received. Since voice signals may be present at −7 dB, a worst case SNR for the CAS may be −25 dB. An SNR of −20 dB will not be uncommon. Further, there may be a power differential between the two CAS tones, which may be as high as 6 dBm.

It is very difficult for conventional DTMF detectors to effectively detect a DTMF signal such as the CAS in the presence of voice signals. Such detectors separate an input signal into an upper and a lower band by using a low pass filter and a high pass filter. The filter outputs are passed to an appropriate detector. The input filters can be analog, digital, switched capacitor, and the like. The detectors can be a peak-to-peak type, phase-locked-loop (PLL) type, and the like. However, such a conventional arrangement cannot reliably detect a brief CAS having a low SNR, i.e., a CAS that is attenuated and interfered with by a voice signal.

Another significant problem is that a voice signal can easily mimic the CAS and cause a false detection. This presents a problem since the local telephone is muted each time a CAS is detected and an acknowledge signal is sent. If many false detections occur, a telephone conversation may repeatedly be interrupted by unnecessary muting, producing a very annoying distraction for the conversing parties.

The majority of false detections are caused by a local voice signal, i.e., near end speech. This is because the distant party's voice signal is attenuated by the communication network, which makes it less likely to produce a false detection. Therefore, the CIDCW service would be vastly improved by eliminating false detections caused by a local signal.

SUMMARY OF THE INVENTION

The present invention provides method and apparatus for reliably detecting a CAS. By verifying that a detected CAS is a valid CAS, the present invention minimizes false detections and thereby avoids unnecessarily muting a local telephone during an established call.

In a preferred embodiment of the present invention, an apparatus for verifying that a CAS detect signal, which indicates the presence of a CAS on a transmission channel, is a valid detect signal comprises means for suppressing a signal originating at a local telephone in response to the CAS detect signal, means for determining whether the CAS detect signal remains in a predetermined condition at a predetermined time after the local telephone signal is suppressed, and means for outputting a validity signal when the CAS detect signal remains in the predetermined condition at the predetermined time.

According to another aspect of the present invention, an apparatus for detecting, at a user's location adjacent a telephone or integral with the telephone, a valid incoming CAS on a transmission channel comprises means for receiving at the user's location an incoming signal including the CAS, means for processing the incoming signal to detect the CAS, and means for verifying that the detected CAS is a valid CAS.

According to yet another aspect of the present invention, an apparatus for processing, at a user's location adjacent a telephone or integral with the telephone, an incoming CAS comprises means for receiving on a transmission channel an incoming signal including the CAS, means for processing the incoming signal to detect the CAS, means for suppressing a signal originating at a local telephone in response to detection of the CAS, means for monitoring the detected CAS to determine whether the detected CAS changes condition within a predetermined time period after suppression of the local telephone signal, and generating means for generating an acknowledge signal when the detected CAS remains in a predetermined condition after the predetermined time period.

According to a further aspect of the present invention, an apparatus for processing, at a user's location adjacent a telephone or integral with the telephone, an incoming CAS, comprises a detection circuit to detect a CAS on a transmission channel and to output a detect signal, a suppression circuit connected between the telephone and the transmission channel, and a control circuit to (i) receive the detect signal, (ii) control said suppression circuit to suppress a signal originating at the telephone when said control circuit receives the detect signal, and (iii) output a valid detect signal when said control circuit determines that the detect signal is in a predetermined condition at a predetermined time after the telephone signal is suppressed.

According to yet a further aspect of the present invention, an apparatus for processing, at a user's location adjacent a telephone or integral with the telephone, an incoming CAS comprises a pair of bandpass filters having central frequencies corresponding to respective frequency components of the CAS, a pair of PLL tone detectors having central frequencies corresponding to respective frequency components of the CAS and arranged to receive respective outputs of said pair of bandpass filters, means for combining outputs of said pair of tone detectors, an electrically controlled switch means coupled between the telephone and a telephone channel, an acknowledge signal generator connected to the telephone channel, and a control circuit to (i) receive the output of said means for combining, (ii) control said switch means in accordance with the output of said means for combining to disconnect the telephone from the telephone channel, (iii) detect a change in the output of said means for combining in response to disconnection of the telephone, and (iv) control said acknowledge signal generator to output an acknowledge signal if no change is detected in the output of said means for combining within a predetermined period of time after the telephone is disconnected.

In another aspect, the present invention provides a method of verifying that a CAS detect signal, which indicates the presence of a CAS on a transmission channel, is a valid detect signal, comprising the steps of suppressing a signal originating at a local telephone in response to the CAS detect signal, determining whether the CAS detect signal remains in a predetermined condition at a predetermined time after the local telephone signal is suppressed, and outputting a validity signal when the CAS detect signal remains in the predetermined condition at the predetermined time.

In yet a further aspect, the present invention provides a method of detecting, at a user's location adjacent a telephone or integral with the telephone, a valid incoming CAS on a transmission channel, comprising the steps of receiving at the user's location an incoming signal including the CAS, processing the incoming signal to detect the CAS, and verifying that the detected CAS is a valid CAS.

In still another aspect, the present invention provides a method of processing, at a user's location adjacent a telephone or integral with the telephone, an incoming CAS, comprising the steps of receiving on a transmission channel an incoming signal including the CAS, processing the incoming signal to detect the CAS, suppressing a signal originating at a local telephone in response to detection of the CAS, monitoring the detected CAS to determine whether the detected CAS remains in a predetermined condition at a predetermined time after suppression of the local telephone signal and generating an acknowledge signal when the detected CAS remains in the predetermined condition at the predetermined time.

DETAILED DESCRIPTION OF THE PRESENTLY PREFERRED EMBODIMENTS

The present invention is directed to a CAS detection circuit for a CIDCW system that may comprise an integrated CIDCW/telephone product or a stand-alone CIDCW unit that can be coupled to a telephone line and a telephone.

Generally, a CAS is transmitted by a Central Office, detected at a local telephone user's location, and acknowledged with a predetermined acknowledge signal. In response to the acknowledge signal, the Central Office transmits calling party information to the user's location. However, a signal originating at the local telephone, such as a voice signal or noise signal, may mimic the CAS, i.e., may contain the same frequency components as the CAS. Therefore, it is desirable to verify that a detected CAS is a valid CAS, rather than a false detection caused by a signal originating at the local telephone.

Figure 1:
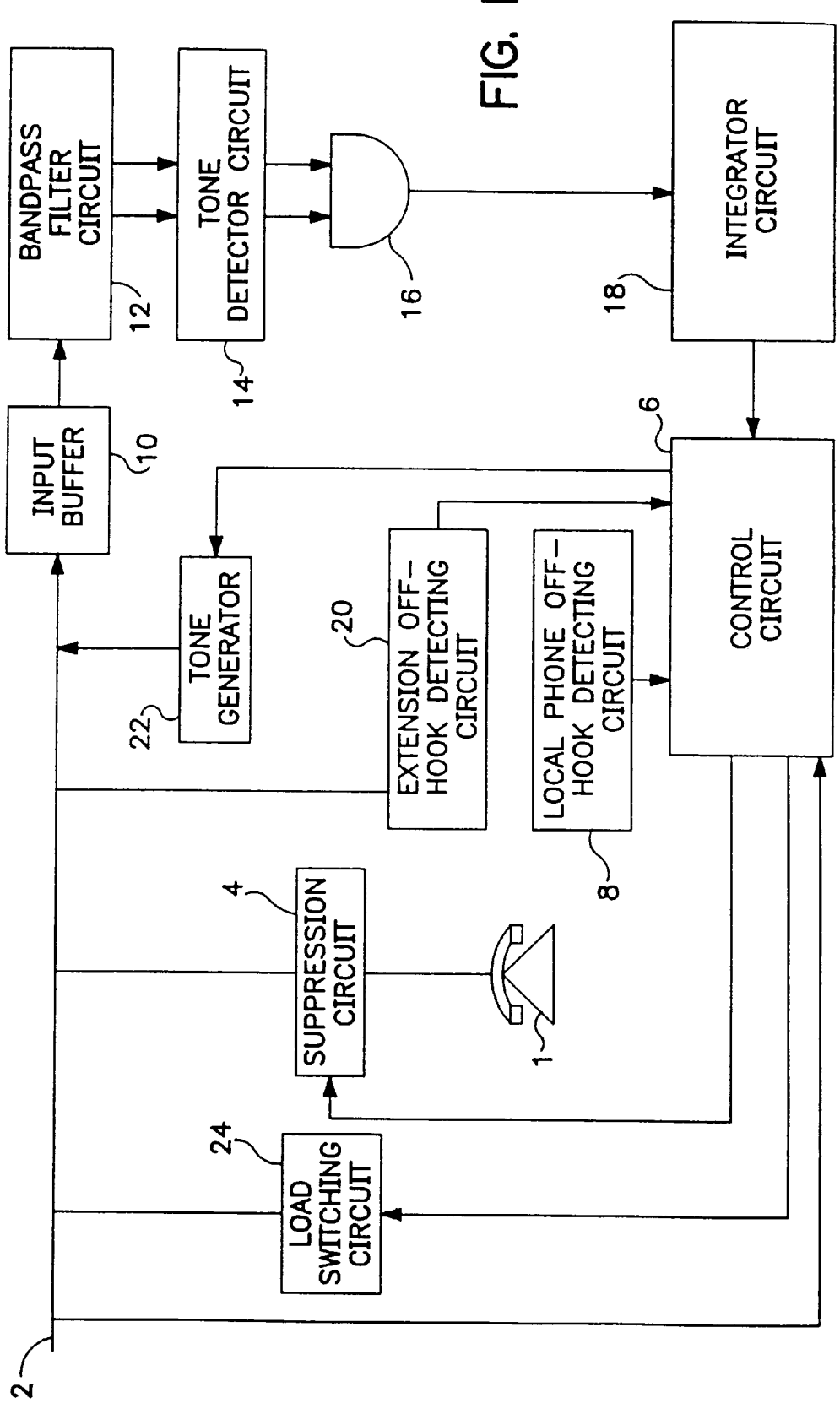
FIG. 1 is a schematic block diagram of the apparatus according to a presently preferred embodiment.

FIG. 1 represents a schematic block diagram of the functional blocks used in the presently preferred embodiment of the invention, which detects and processes a CAS in a unique and novel way.

A telephone signal S is transmitted between a Central Office and a local telephone 1 at a user's location on a transmission channel 2 (typically a telephone line, or a cellular phone frequency band). Telephone signal S, as it exists at the user's location, may comprise various superposed signals, such as a local voice signal or noise signal from the telephone 1, a voice signal or noise signal from a distant calling party, and special signals transmitted by the Central Office, such as an SAS, a CAS, or the like.

In the preferred embodiment, a suppression circuit 4 is connected in series with the telephone 1 between the transmission channel 2 and the telephone 1. Suppression circuit 4 is controlled by a control circuit 6 in a manner to be described below.

Since CIDCW only functions during an established call, the preferred embodiment includes structure to place the apparatus in a CIDCW mode only when the local telephone is off-hook. Local telephone off-hook detection circuit 8 detects the state of the local telephone, i.e., an on-hook state or an off-hook state, and provides a status signal to the control circuit 6. The control circuit 6 uses the status signal to determine whether a CIDCW mode should be initiated. The control circuit 6 comprises a microcontroller in the preferred embodiment, but can comprise a microprocessor, a programmable logic device, or any other circuit capable of performing the described control functions.

The control circuit 6 can be designed or programmed to process an incoming ICLID signal when the local telephone is on-hook, in addition to off-hook CIDCW processing. In that case, the status signal from the local telephone off-hook detecting circuit 8 can be used to switch between an on-hook mode for performing conventional ICLID signal processing and an off-hook mode for performing CAS detection and CIDCW processing. Conventional ICLID signal processing refers to known processing of an ICLID signal received between first and second ring signals while a local telephone is on-hook, as discussed in U.S. Pat. No. 5,228,080 to Nutter et al., for example. That patent is incorporated herein by reference.

The telephone signal S is received by an input buffer 10. The input buffer 10 provides a high impedance input to avoid loading down the signal source and to provide a low impedance drive for the following blocks. The circuit input is an amplified version of telephone signal S as presented at the user's location, e.g., as presented at tip and ring where the transmission channel is a telephone line.

A bandpass filter circuit 12 receives the output from the input buffer 10. Bandpass filter circuit 12 minimizes the effects of near end speech, i.e., the local voice signal or noise signal, by passing only the frequencies that will be detected by the associated tone detector circuit 14, described below. In particular, the bandpass filter circuit 12 provides two output signals respectively corresponding to frequency bands centered at 2130 Hz and 2750 Hz, i.e., at the two frequency components of the CAS.

A tone detector circuit 14 receives the two outputs of the bandpass filter circuit 12 and detects 2130 Hz and 2750 Hz tones in the respective signals. Two signals are output from the tone detector circuit 14, one corresponding to each tone to be detected.

A combining circuit 16 receives the two output signals of the tone detector circuit 14 and produces an output signal when both tones are detected simultaneously. The output of the combining circuit 16 is fed into an integrator circuit 18, which integrates the combining circuit output and outputs a CAS detect signal or a signal used to produce a CAS detect signal, e.g., a signal that turns on a transistor connected to a reference voltage.

By the above-described arrangement, the present invention can detect a true CAS even when the SNR is low due to a local signal. However, a CAS detect signal output by the integrator circuit 18 may sometimes be a false detection caused by a signal originating at telephone 1 rather than a valid CAS received from the Central Office. Therefore, the present invention verifies that the CAS detect signal indicates a valid CAS. The verification can be performed, for example, in a manner described below using hardware, software, or a combination of both.

In the preferred embodiment, verification is performed by a combination of a microcontroller executing instructions and other hardware. In particular, verification is performed by the control circuit 6 in cooperation with the suppression circuit 4. The CAS detect signal is input to the control circuit 6 from the integrator circuit 18. In response to the leading edge of the CAS detect signal, the control circuit 6 causes the suppression circuit 4 to suppress a signal originating at telephone 1, i.e., the signal from the telephone 1 is suppressed, inhibited, removed, filtered, attenuated, or otherwise prevented from being a significant component of the signal on the transmission channel 2. In the preferred embodiment, the suppression circuit 4 disconnects the telephone 1 from the transmission channel 2.

If the CAS detect signal is caused by a signal originating at the telephone 1, suppressing the local signal briefly should cause the CAS detect signal to significantly decrease, disappear, or otherwise change condition. However, the change may be delayed by logic delays, circuit capacitors, etc. Therefore, the control circuit 6 detects whether the CAS detect signal changes within a predetermined time period (or at a predetermined time) after suppression of the local telephone signal. In the preferred embodiment, this predetermined time is about 20 ms. If the CAS detect signal remains in a predetermined condition after the predetermined time period, the CAS detect signal is deemed valid. The control circuit 6 then mutes the telephone (which may be done using the suppression circuit 4), if necessary. In the preferred embodiment, since the suppression circuit 4 disconnects the telephone 1 during verification of the CAS, a separate muting step is unnecessary. After waiting for the CAS to go away, i.e., terminate, the control circuit 6 outputs a control signal, i.e., a valid detection signal or validity signal, to cause a tone generator 22 to output an acknowledge signal.

If the CAS detect signal is a false detection, the detect signal should change when the local telephone signal is suppressed. When this occurs, the detection is recognized as being false, the local telephone signal is restored, and normal conditions resume.

One of ordinary skill will readily appreciate that the predetermined condition of the CAS detect signal can be any signal that indicates a CAS detection, e.g., a predetermined voltage, a ramp signal, an undulating or oscillating signal, a specific signal pattern such as a particular bit stream, or the like. A change in the predetermined condition is any change recognizable as an indication that a CAS is no longer being detected. Further, the CAS detection signal may be monitored during the entire predetermined period, checked occasionally within that period, checked at the expiration of the period, e.g., after 20 ms have elapsed, etc.

It should be noted that the suppression circuit 4 of the preferred embodiment may not suppress an incoming voice signal from a calling party. Therefore, it is possible that a false detection may be caused by that voice signal. As discussed above, however, the communications network will attenuate the level of the calling party's voice signal and therefore that signal is less likely to produce false detections. Further, that signal is not likely to produce a false detection signal that remains unchanged for the entire predetermined time period. Thus, the number of false detections due to a calling party's voice signal should be minimal and should not pose a significant problem during conversation.

As noted above, the calling party information signal causes an unpleasant noise in a local telephone. This applies to local extensions as well. In addition, if any local extensions are off-hook, the calling party information signal and the acknowledge signal may be degraded. Therefore, it is preferable not to acknowledge a CAS or receive the calling party information signal if a local extension is off-hook. Extension off-hook detecting circuit 20 determines whether any local extensions are off-hook and sends a status signal indicative of that determination to the control circuit 6. This determination is made when a valid CAS has been detected, after the CAS goes away. If a local extension is off-hook, the control signal to the tone generator 22 is not output. If no extension is off-hook, the control circuit 6 proceeds with sending the acknowledge signal, i.e., it mutes telephone 1 (which may be performed using suppression circuit 4), if necessary, and outputs a control signal to the tone generator 22 to generate the acknowledge signal.

Tone generator 22 outputs a DTMF "D" signal. That signal consists of tones of 941 Hz and 1633 Hz. The output of the tone generator is interfaced to the transmission channel 2 and is received at the Central Office. In response, the Central Office transmits the calling party information signal.

When the local signal from the telephone 1 is suppressed during processing of the CAS, particularly when telephone 1 is disconnected from the transmission channel 2, a loud audible noise, e.g., a clicking sound, may occur at telephone 1. To minimize this noise, the load switching circuit 24 is connected to the transmission channel 2 in parallel with the telephone 1. The control circuit 6 controls the load switching circuit 24 to apply a load in parallel with the telephone 1 just prior to suppressing the local signal. In this way, a substantial amount of loop current is diverted from the telephone through the load resistance. This reduces the effect of a sudden disruption of loop current when the local signal is suppressed (e.g., when the telephone 1 is disconnected) since the amount of loop current flowing through the telephone has been reduced. When the local signal is restored, the process is reversed by connecting the telephone 1 to the transmission channel 2 and then disconnecting the load.

Next, an implementation of the preferred embodiment is discussed with respect to FIG. 2, which is a circuit diagram of a portion of the preferred embodiment. The functional blocks of FIG. 1 are indicated by dashed outlines and like reference numerals in FIG. 2.

In the preferred embodiment, the transmission channel 2 is a telephone line 40 having a ring conductor 40A and a tip conductor 40B. However, the transmission channel 2 can comprise a physical channel such as a twisted-wire pair, a fiber optic link, a coaxial cable, or the like, or a broadcast channel with signals transmitted on a carrier, including cellular systems, for example. The method and apparatus of the invention can be adapted for use with any channel capable of carrying standard telephone signals.

A resistor R1 and a metal oxide varistor Z1 provide a protection network to protect the telephone network equipment against short circuits and to protect the CPE against voltage spikes. Suppression circuit 4 comprises a line relay 42 connected in series with telephone 1. The line relay 42 is controlled by the control circuit 6 to disconnect the telephone 1 while verifying that a detected CAS is a valid CAS. The line relay 42 is also used for muting the telephone 1 in this preferred embodiment, and may be used in connection with extension off-hook detection. The suppression circuit 4 need not be a relay, but can be some other type of electrically controlled switch, such as a field effect transistor, a bipolar junction transistor, a solid-state switch, or the like. Further, the suppression circuit need not physically disconnect the telephone 1 but instead could comprise a filter, an attenuator, or the like, and separate devices can be used for muting and extension off-hook detection.

Local telephone off-hook detecting circuit 8 comprises an optical coupler 9 and a resistor R3. Optical coupler 9 has photodiodes D1 and D2 and a phototransistor Q1. When the local telephone is off-hook, a loop current flows through either the photodiode D1 or the photodiode D2, causing it to emit light. The phototransistor Q1 detects the light, and a status signal is output to the control circuit 6. The optical isolator provides an advantage of not interfering with the loop current. However, any detection circuit that can indicate a status, i.e., an on-hook state or an off-hook state, of telephone 1 can be used.

The control circuit 6 receives inputs from various units, performs logical operations, and outputs control signals to various units. As indicated above, the preferred embodiment uses a microcontroller in logic control circuit 6. The control circuit 6 also includes a power control section 44 for controlling power to the various components. The power control section can detect the presence of a power source (not shown) for supplying power to the apparatus. The power source may be a battery, an a/c adapter, or the like. In the preferred embodiment, the operation of the CIDCW processing mode is inhibited if an a/c adapter is not present. This ensures that an adequate power supply is available for prolonged operation of the apparatus in an off-hook processing mode.

The signal on the telephone line 40 is fed to a differential input amplifier and filter 46. This circuit can remove a bias voltage from the signals transmitted on the ring conductor 40A and the tip conductor 40B and amplify the voltage difference. The output of this circuit is provided to a CAS detect circuit comprising the input buffer 10, the bandpass filter circuit 12, the tone detector circuit 14, the combining circuit 16, and the integrator circuit 18.

The input buffer 10 comprises an operational amplifier 48 having high input impedance. The output of the operational amplifier 48 is fed to the bandpass filter circuit 12 for separating the CAS tones from the input, i.e., incoming, signal. The bandpass filter circuit 12 uses two active bandpass filters 50 and 52 having respective center frequencies at 2130 Hz and 2750 Hz, the two tones that make up the CAS. The two filters are multiple feedback type bandpass filters having a Q value of 10. Other bandpass filter types can be used and the gain and Q value can be adjusted to obtain desired sensitivities. Further, other circuit arrangements are possible to separate the CAS tones. For example, the CAS frequencies can be separately blocked in the incoming signal, and the resulting signals can be subtracted from the original incoming signal to produce difference signals corresponding to the respective CAS frequencies.

Outputs of the bandpass filters 50 and 52 are fed into the tone detector circuit 14, which preferably comprises two PLL tone detectors 54 and 56 having respective center frequencies at 2130 Hz and 2750 Hz. The center frequencies of the PLL tone detectors are easily adjusted to meet input tone frequency requirements. The bandwidth of the detectors should be set to be as narrow as possible to eliminate the majority of voice and noise signals, yet must be capable of detecting the CAS tones at their high and low frequency limits, which are the nominal values ±0.5%. Component tolerances and drift over time and with temperature changes must also be taken into account. The preferred embodiment uses a bandwidth of 50 Hz.

The tone detection is performed using PLL type tone detectors in the preferred embodiment because they provide excellent bandwidth control and can be adjusted to provide the desired loop response times necessary to detect short tone bursts in a relatively quick manner. The CAS tone bursts to be detected are about 80 ms long. It is preferable for the tone detectors to have a response time of about 10 ms, so that the overall detection time, including integration of the combined tone detector outputs, is about 30 ms or less.

Outputs of the tone detectors 54 and 56 are combined by combining circuit 16. In the preferred embodiment, the outputs of the tone detectors 54 and 56 are wired together to form a virtual AND gate. Of course, any type of combining circuit, such as a logical AND gate, for example, can also be used. The output of the combining circuit 16 is fed to the integrator circuit 18, which is an analog integrator comprising two resistors R11 and R12 having respective resistance values r1 and r2 and a capacitor C1 having a capacitance c. The charging time constant t1 is a function $t1=(r1+r2)*c$ and the discharge time constant t2 is a function $t2=r2*c$. The values chosen for t1 and t2 will determine the reaction time of the CAS detect circuit, i.e., the shape of the leading and trailing edges of the CAS detect signal. In the preferred embodiment, r1=220 K ohms, r2=130 K ohms, and c=0.1 $\mu$F, which makes t1=35 ms and t2=13 ms.

The output of integrator circuit 18 is input to a voltage comparator CMP1, the output of which is connected to the base of a transistor Q4 through a resistor R13. The collector of the transistor Q4 is connected to a voltage source through a resistor R14. When the output of the integrator circuit 18 exceeds a predetermined level, the comparator CMP1 outputs a signal which turns on the transistor Q4. A CAS detect signal is then produced at the collector of the transistor Q4. In the preferred embodiment, a voltage signal of +5 volts indicates that a CAS has been detected, i.e., a logic bit "1" is input to the control circuit 6.

Extension off-hook detecting circuit 20 comprises resistors R4, R5, R6, and R7, diode D7 and transistor Q2. A status signal is sent from the collector of transistor Q2 to control circuit 6. To determine whether an extension is off-hook, the telephone 1 (or a load, described below, that may be connected to the telephone line 40) is disconnected from the telephone line 40 for a short time, e.g., 10 ms, and the line voltage of the telephone line 40 is monitored by the extension off-hook detecting circuit 20.

If the telephone 1 is the only local telephone off-hook, the line voltage will increase significantly when the telephone 1 (or the load) is disconnected. However, if a local extension is off-hook, the line voltage will not greatly increase when telephone 1 is disconnected. For example, the line voltage may be about 15 volts when a local telephone is off-hook, and about 48 volts when all extensions and telephone 1 are on-hook. Therefore, if the line voltage rises above a certain threshold level, e.g., about 30 volts d.c., the control circuit 6 will determine that no extensions are off-hook, will restore the load, and will output a control signal to the tone generator 22. In the preferred embodiment, this determination is made after the CAS goes away. However, there are obvious variations that work as well. For example, the extension off-hook detection can be performed immediately after detecting a valid CAS, and then the apparatus can wait for the CAS to go away before sending an acknowledge signal.

A polarity guard circuit comprises a bridge rectifier circuit having diodes D3, D4, D5, and D6, and ensures that the extension off-hook detecting circuit 20 monitors a line voltage with the proper polarity.

The tone generator 22 comprises a standard industry integrated circuit 58, which can generate a DTMF "D" signal in response to control signals from control circuit 6. The integrated circuit 58 is controlled by a crystal X1 and is interfaced to the telephone line 40 via a transistor Q3 and a resistor R10.

The load switching circuit 24 includes a solid state switch 60, which is controlled by the control circuit 6, and a load including the resistors R8 and R9 and the Zener diode Z2. The switch 60 is activated to connect the load to telephone line 40 just prior to energizing the line relay 42 to disconnect the telephone 1, thereby diverting a significant amount of loop current to the load and minimizing an audible clicking noise when the telephone 1 is disconnected.

Figure 3:
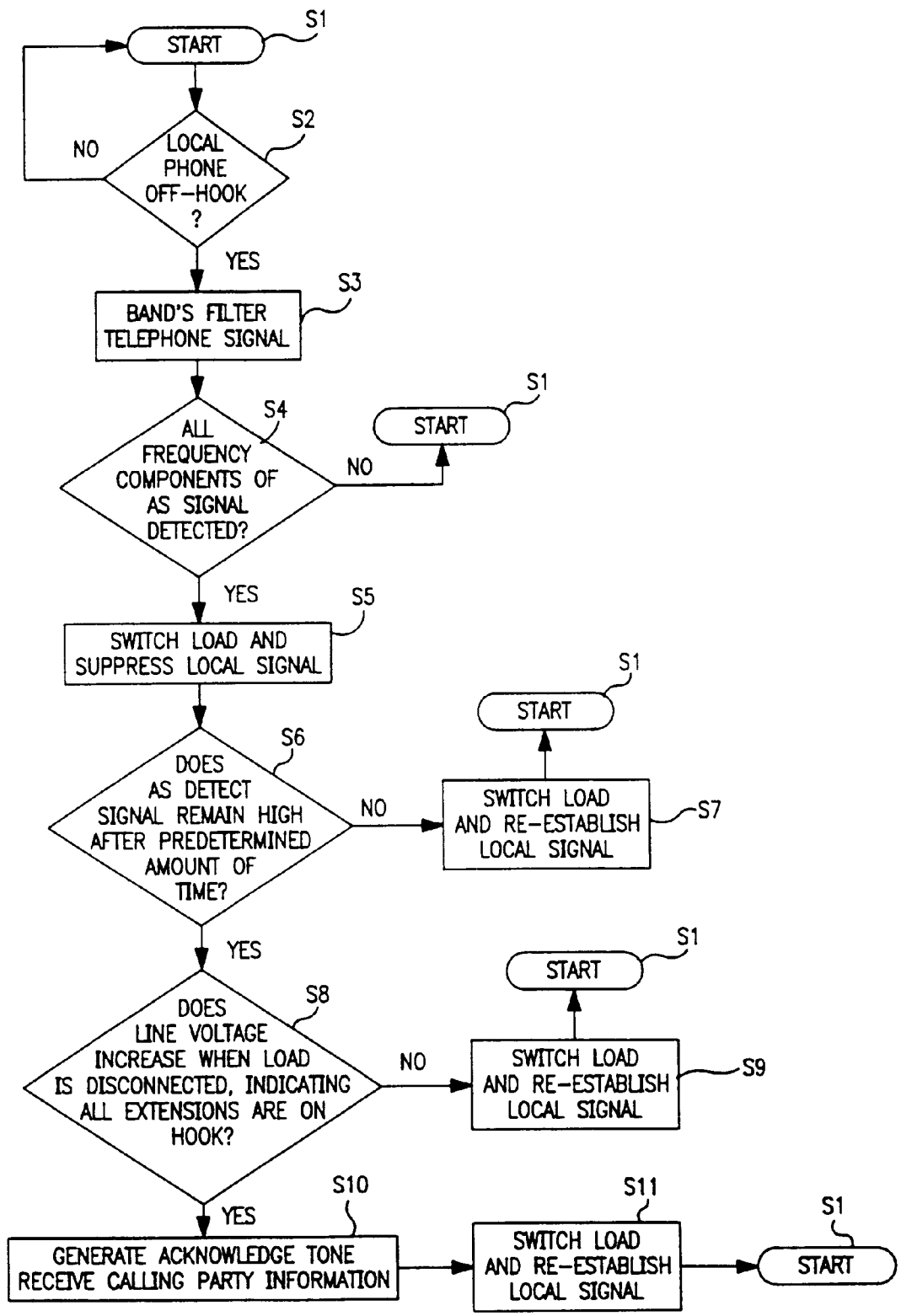
FIG. 3 is a top-level flow chart illustrating the method of the invention as it may be practiced in a preferred embodiment.

The operation of the preferred embodiment is now described with respect to the flow chart shown in FIG. 3 which may be encoded as software stored in a ROM (not shown) of the control section 6. The process starts at Step S1 where power is supplied to the control circuit 6. At Step S2, a determination is made as to whether the local telephone is off-hook. If not off-hook, the process returns to Step S1.

If the local telephone is off-hook, the incoming signal is bandpass filtered at Step S3. Next, a determination is made at Step S4 as to whether all frequency components of the CAS, i.e., 2130 Hz and 2750 Hz tones, have been detected. If they have not been detected, the process returns to Step S1.

If the CAS has been detected, a load is switched to the telephone line and the local telephone signal is suppressed, e.g., the telephone is disconnected, at Step S5. Then, a determination is made at Step S6 as to whether the CAS detect signal remains high, i.e., in a predetermined condition, after a predetermined amount of time. If the CAS detect signal does not remain high, it is assumed that the CAS detect signal was a false detection. Then the local telephone signal is re-established, i.e., restored to its previous level, and the load is removed at Step S7. The process then returns to Step S1.

If the CAS detect signal remains high in Step S6, the process proceeds to Step S8, to determine whether all extensions are on-hook. Since the telephone 1 remains disconnected from Step S5, it is the load that is connected to the telephone line 40 at that time. Therefore, after the CAS goes away, the load is briefly disconnected, e.g., for about 10 ms, and the line voltage on the telephone line 40 is monitored for a voltage rise indicating all extensions are on-hook. If all extensions are not on-hook, the telephone 1 is reconnected, i.e., the local signal is re-established, in Step S9 and the process returns to Step Si.

If all extensions are on-hook, then the acknowledge tone is generated (the telephone 1 remains disconnected and therefore is already muted), and the calling party information is received at Step S10. The local signal is then re-established in Step S11, i.e., the telephone 1 is reconnected and the load is disconnected, and the process returns to Step S1.

Figure 4:
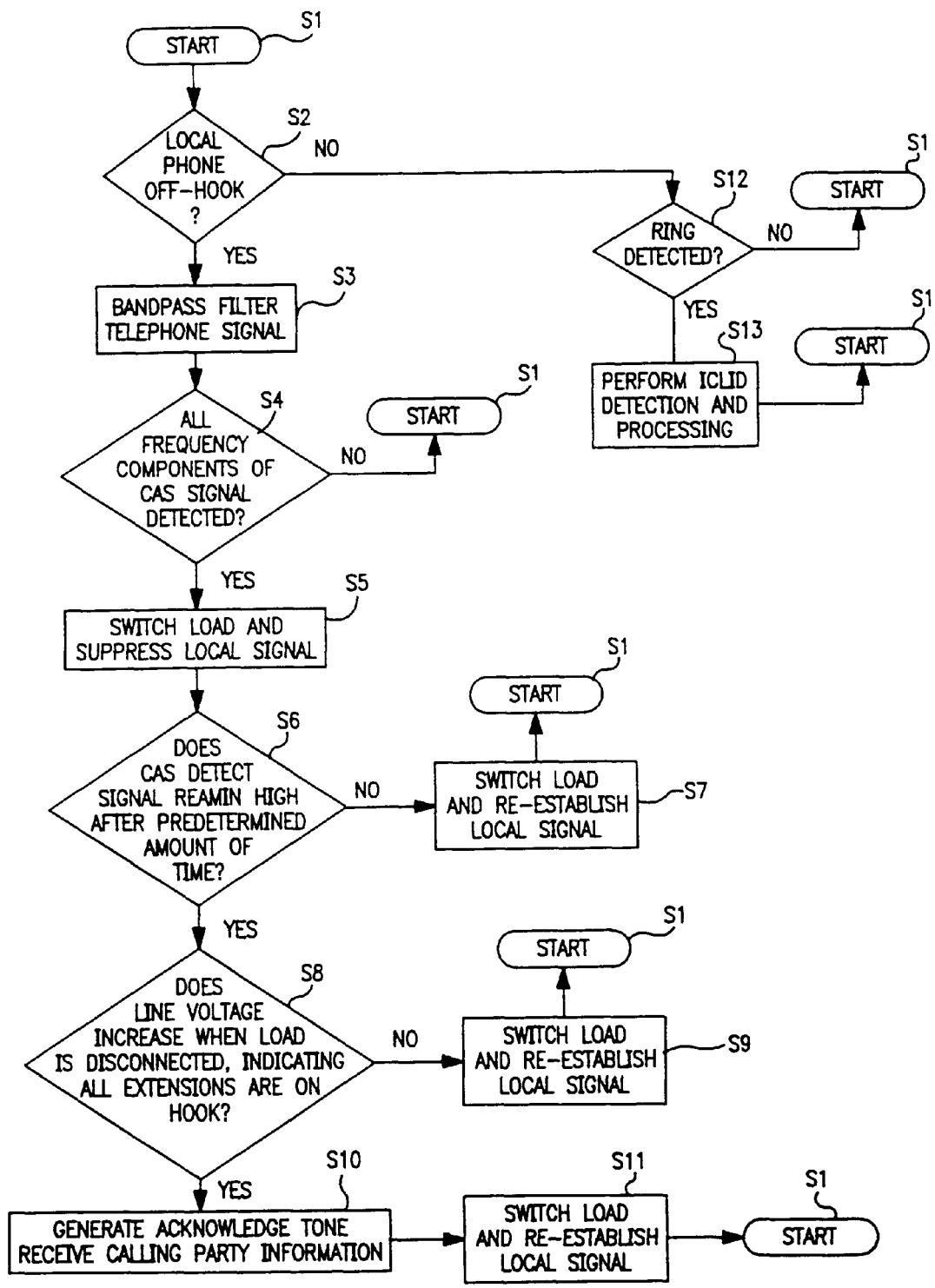
FIG. 4 is a top-level flow chart illustrating a variation of the preferred embodiment in which an apparatus can perform either on-hook or off-hook processing of calling party information.
Figure 2A:
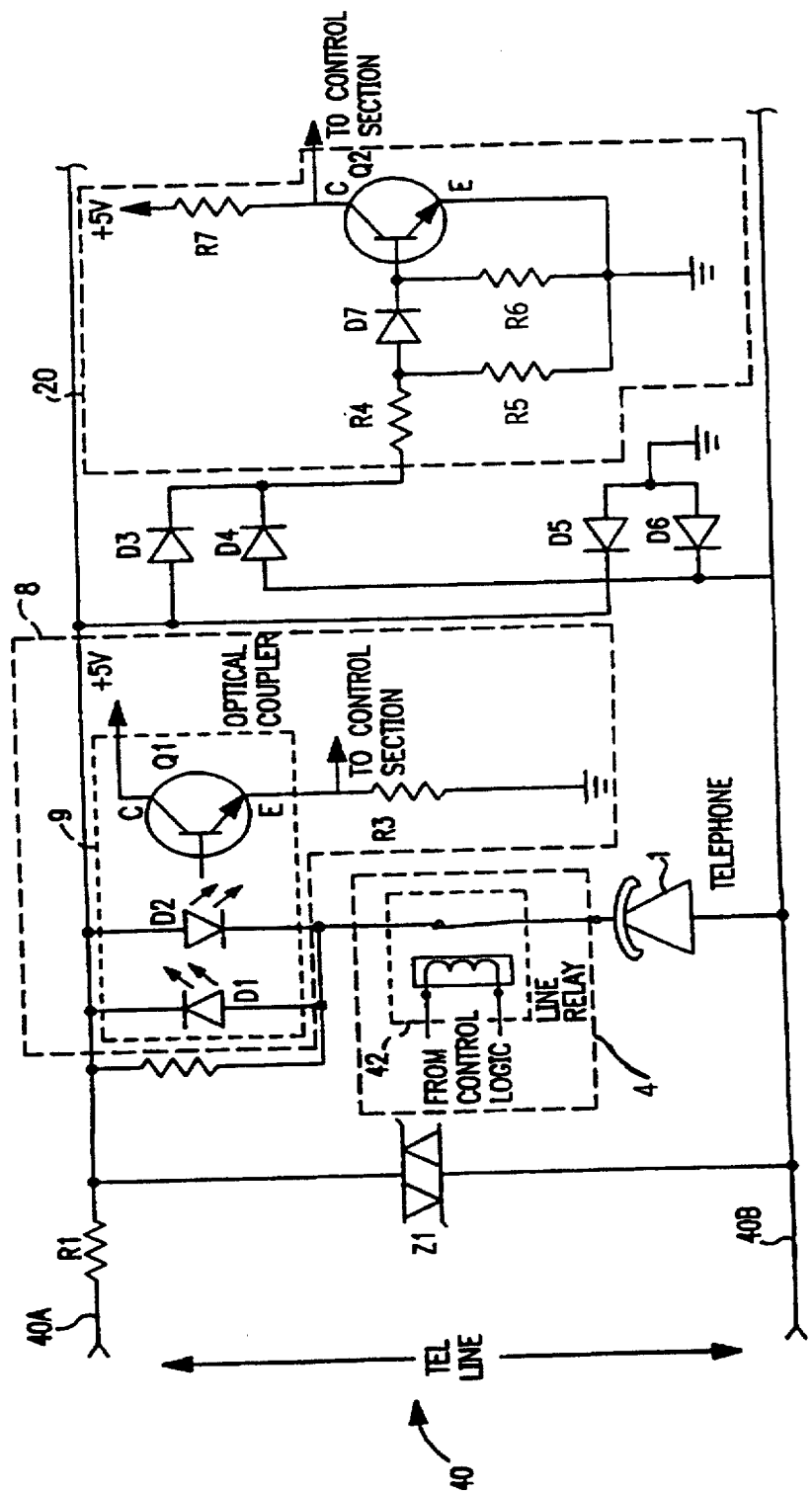
Figure 2B:
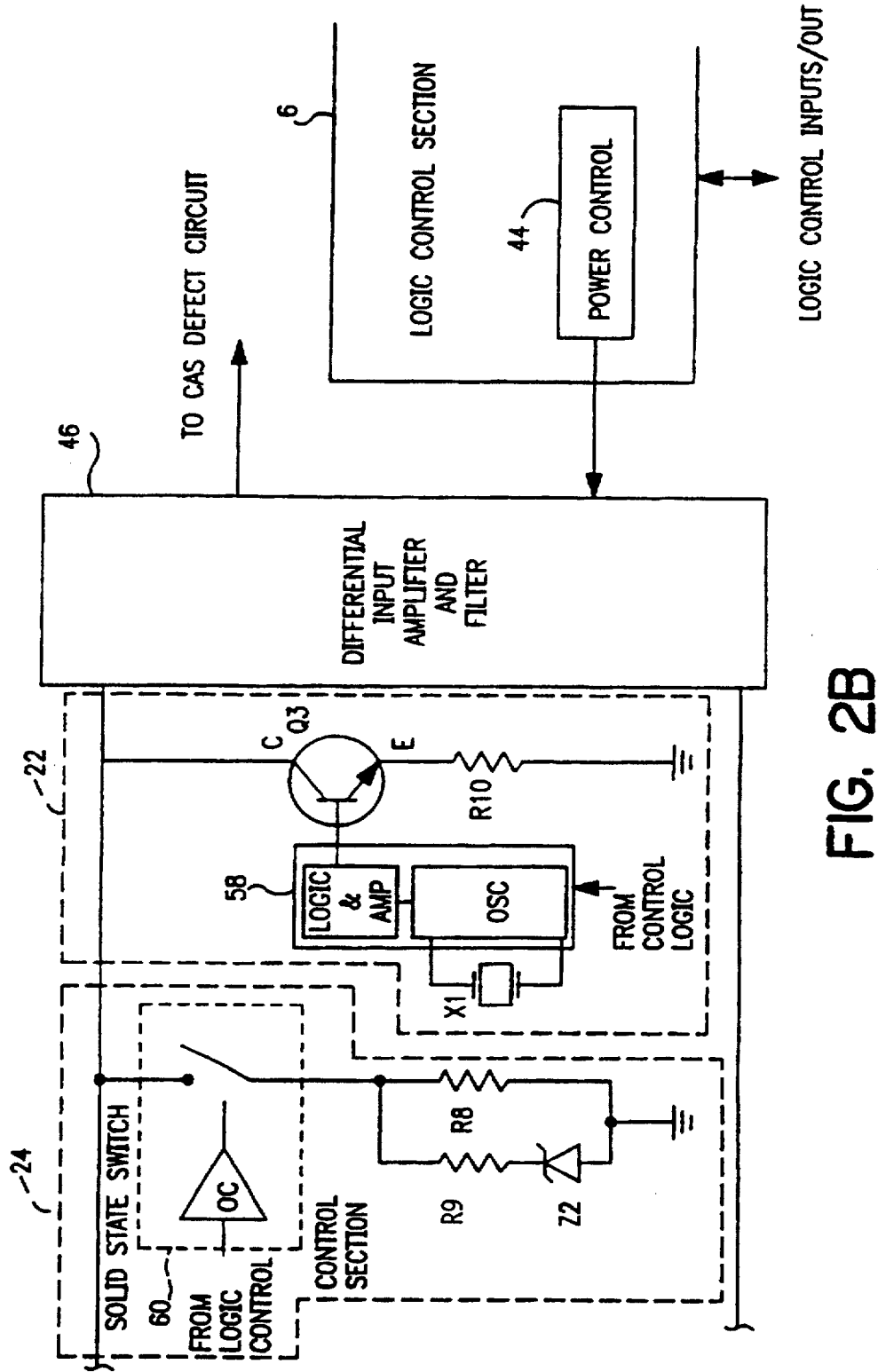

An alternative operation of the preferred embodiment is now described with respect to the flow chart shown in FIG. 4. Steps identical to those in FIG. 3 have identical reference numbers, and a description of those steps will not be repeated.

In this embodiment, the invention receives and processes an ICLID signal when the local telephone is on-hook, and detects and processes a CAS when the local telephone is off-hook. In this embodiment, if it is determined in Step S2 that the local telephone is not off-hook, i.e., is on-hook, the process goes to a Step S12.

In Step S12, a determination is made whether a ring signal has been detected. If a ring signal has not been detected, the process returns to Step S1. If a ring signal has been detected, an ICLID signal is detected and processed in Step S13, and then the process returns to Step S1.

The preferred embodiment described above can be modified in many ways. For example, it will be appreciated that there are other ways of verifying that a CAS detect signal is valid other than cutting-off the local telephone signal. The CAS detect signal could be monitored to determine whether it remains in a predetermined condition for the period of time a valid CAS would be expected to last. This technique would handle false detections caused by a distant signal as well as a local signal. Alternatively, a local telephone signal could be processed independent of an incoming signal on a transmission channel to detect components of the local signal that might mimic a CAS. Coincidence of such components with a CAS detect signal could be used to determine that the detect signal is a false detection. Also, a combination of verifying procedures can be used.

Further, it is not necessary to ensure that no extension is off-hook before transmitting an acknowledge signal. Instead, devices could be installed to allow a control circuit to mute the extensions as well as the local telephone before transmitting the acknowledge signal.

Also, the timing of disconnecting and connecting devices may be varied. For example, telephone 1 can be reconnected immediately after Step S6, when a CAS signal has been verified as being valid, and telephone 1 is then disconnected in Step S8 to determine if all extensions are on-hook.

The individual components shown in outline or designated by blocks in the drawings and which are not discussed in detail herein are all well-known in the telephone signal processing arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for detecting, at a user's location adjacent a telephone or integral with the telephone, a valid incoming CAS (Customer Premises Equipment Alerting Signal) on a transmission channel, said apparatus comprising:
   means for receiving at the user's location an incoming signal including the CAS;
   means for processing the incoming signal to detect the CAS;
   means for determining whether the detected CAS is caused by a signal originating at the user's location or by the incoming signal; and
   means for generating an acknowledge signal when said means for determining determines that the detected CAS is caused by the incoming signal.

2. A method of detecting, at a user's location adjacent a telephone or integral with the telephone, a valid incoming CAS (Customer Premises Equipment Alerting Signal) on a transmission channel, comprising the steps of:

receiving at the user's location an incoming signal including the CAS;

processing the incoming signal to detect the CAS;

determining whether the detected CAS is caused by a signal originating at the user's location or by the incoming signal; and generating an acknowledge signal when said determining step determines that the detected CAS is caused by the incoming signal.

3. An apparatus tor verifying that a CAS (Customer Premises Equipment Alerting Signal) detect signal, which indicates the presence of a CAS on a transmission channel, is a valid detect signal, said apparatus comprising:

means for Suppressing a signal originating at a local telephone in response to the CAS detect signal;

means for detecting whether the CAS detect signal changes condition in response to suppression of the local telephone signal; and means for outputting a validity signal when said means for detecting detects no change in the condition of the CAS detect signal in response to suppression of the local telephone signal.

4. A method of verifying that a CAS (Customer Premises Equipment Alerting Signal) detect signal, which indicates the presence of a CAS on a transmission channel, is a valid detect signal, said method comprising the steps of:

suppressing a signal originating at a local telephone in response to the CAS detect signal;

detecting whether the CAS detect signal changes condition in response to suppression of the local telephone signal; and outputting a validity signal when said means for detecting detects no change in the condition of the CAS detect signal in response to suppression of the local telephone signal.

* * * * *

UNITED STATES PATENT AND TRADEMARK OFFICE
CERTIFICATE OF CORRECTION

PATENT NO. : 6,122,353
DATED : September 19, 2000
INVENTOR(S) : Brady et al.

It is certified that error appears in the above-identified patent and that said Letters Patent is hereby corrected as shown below:

Column 3,
Line 40, after "...invention provides," add -- a --
Line 57, after "...location adjacent," add -- to --
Line 65, after "...location adjacent," add -- to --

Column 4,
Line 12, after "...location adjacent," add -- to --
Line 26, after "...location adjacent," add -- to --
Line 58, after "...location adjacent," add -- to --
Line 65, after "...location adjacent," add -- to --

Column 5,
Line 55, after "...Central Office, such as," change "an" to -- a --

Column 7,
Line 42, after "...within that period," add -- or --

Column 11,
Line 43, correct Si to S1 (PTO error)

Column 12,
Line 7, after "...other than cutting," delete hyphen
Line 49, after "...location adjacent," add -- to --
Line 64, after "...location adjacent," add -- to --

UNITED STATES PATENT AND TRADEMARK OFFICE
CERTIFICATE OF CORRECTION

PATENT NO. : 6,122,353
DATED : September 19, 2000
INVENTOR(S) : Brady et al.

It is certified that error appears in the above-identified patent and that said Letters Patent is hereby corrected as shown below:

<u>Column 13,</u>
Line 10, correct "tor" to -- for -- (PTO error)

Figure 2A:
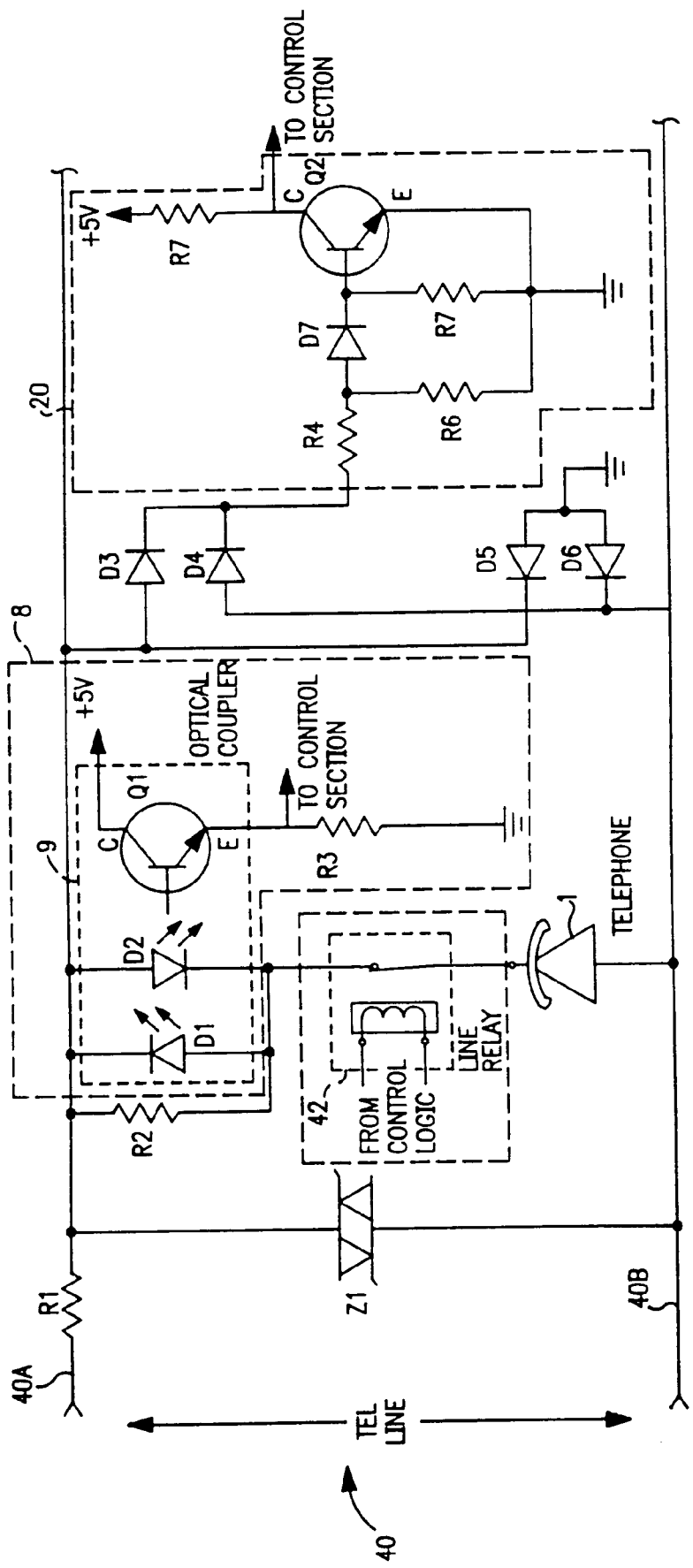
FIG. 2 is a circuit diagram of a portion of the apparatus according to a presently preferred embodiment.

FIG. 2A, sheet 2 of 6 replace attached corrected formal drawing

Figure 2B:
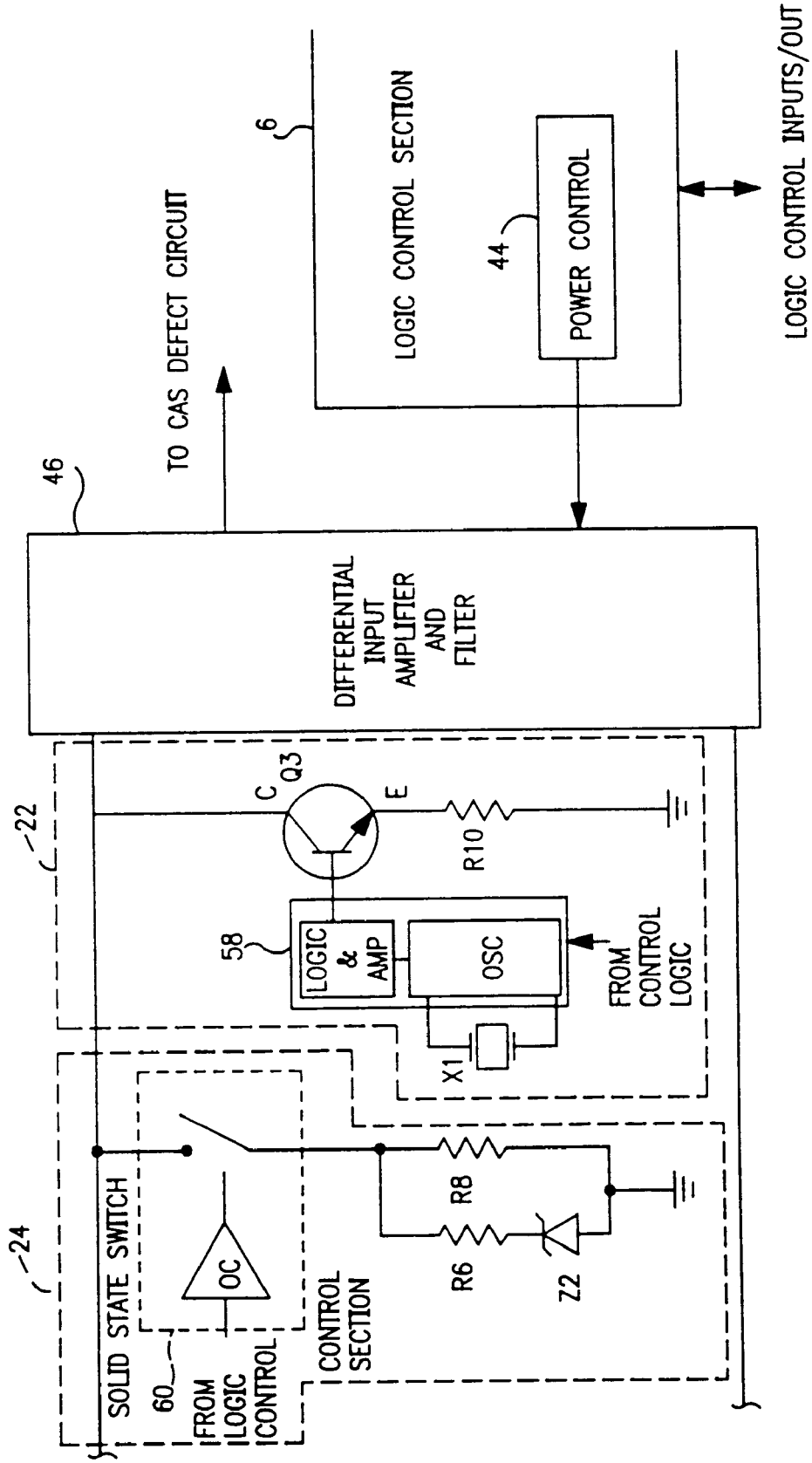
Figure 2C:
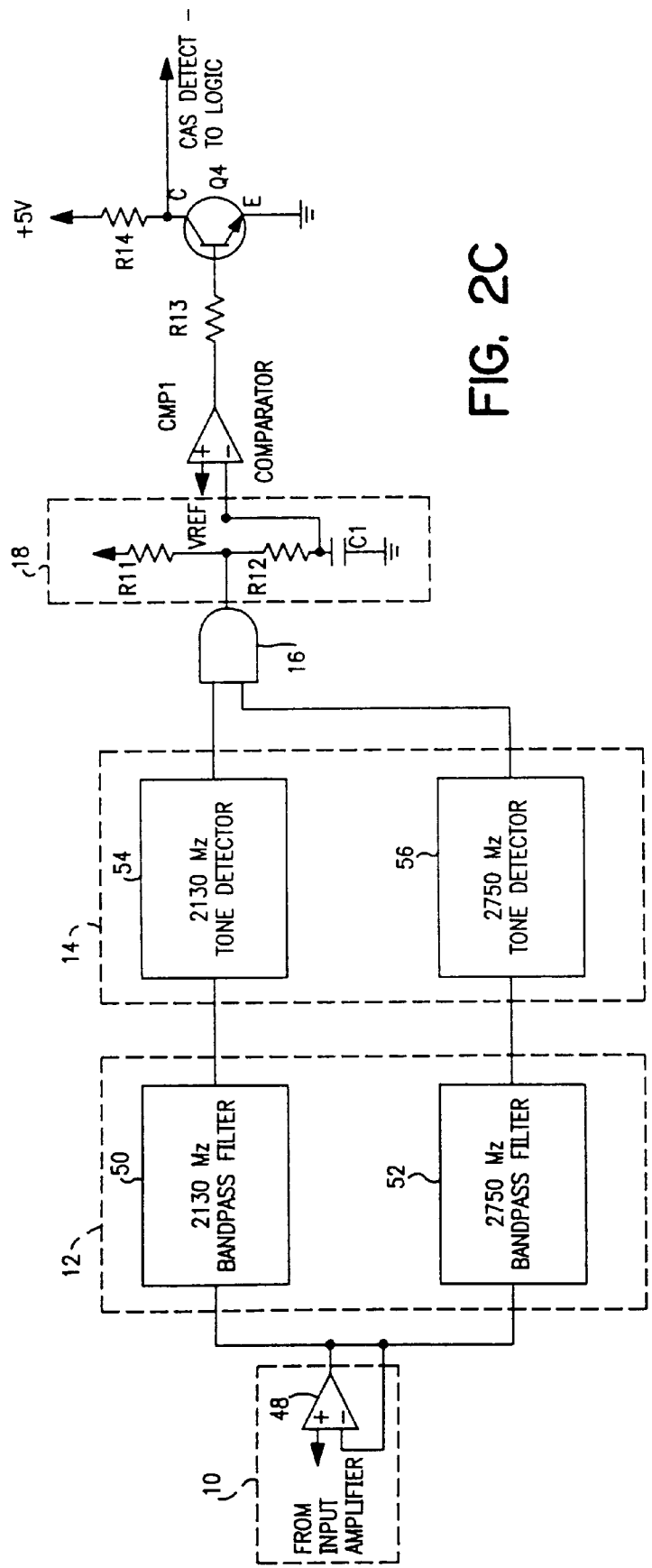

FIG. 2B, sheet 3 of 6, replace attached formal drawing

Signed and Sealed this

Thirteenth Day of November, 2001

*Attest:*

*Nicholas P. Godici*

NICHOLAS P. GODICI
*Attesting Officer*     *Acting Director of the United States Patent and Trademark Office*